United States Patent [19]

Poubeau

[11] 4,363,525
[45] Dec. 14, 1982

[54] MAGNETICALLY SUSPENDED ROTATING BODIES

[75] Inventor: Pierre Poubeau, Yvelines, France

[73] Assignee: Societe Nationale Industrielle Aerospatiale, France

[21] Appl. No.: 229,259

[22] Filed: Jan. 28, 1981

Related U.S. Application Data

[63] Continuation-in-part of Ser. No. 929,077, Jul. 28, 1978, abandoned.

[30] Foreign Application Priority Data

Aug. 3, 1977 [FR] France ............................... 77 23981

[51] Int. Cl.³ .............................................. F16C 39/06
[52] U.S. Cl. ..................................................... 308/10
[58] Field of Search .......................... 308/10; 244/165; 74/5.46

[56] References Cited

U.S. PATENT DOCUMENTS

| | | | |
|---|---|---|---|
| 3,493,275 | 2/1970 | Stone | 308/10 |
| 3,955,858 | 5/1976 | Poubeau | 308/10 |
| 4,077,678 | 3/1978 | Studer | 308/10 |
| 4,211,452 | 7/1980 | Poubeau | 308/10 |

FOREIGN PATENT DOCUMENTS

| | | | |
|---|---|---|---|
| 2309754 | 7/1976 | France | 308/10 |
| 2293623 | 11/1976 | France | 308/10 |

OTHER PUBLICATIONS

"Magnetically Suspended Momentum Wheel", A. V. Sabnis et al., 7/75.

Primary Examiner—R. Skudy
Attorney, Agent, or Firm—Karl W. Flocks; A. Fred Starobin

[57] ABSTRACT

Rotary bodies possessing, in common, radially passive and axially active magnetic centering devices, eddy current dampers, emergency support systems, a drive motor and a motor switching sensor, and an axial velocity sensor to send correction signals to the axially active magnetic centering device with all of these members positioned at the maximum permitted axial limits, either inside or outside the rotor wall, whether the rotor is of an internal or external configuration.

10 Claims, 3 Drawing Figures

MAGNETICALLY SUSPENDED ROTATING BODIES

BACKGROUND OF THE INVENTION

This application is a continuation-in-part of patent application Ser. No. 929,077 of Pierre POUBEAU entitled "MAGNETICALLY SUSPENDED ROTARY BODIES" and filed July 28, 1978, now abandoned.

The present invention relates to magnetically suspended rotating bodies.

Bodies which must be placed in high speed rotation to meet certain particular requirements may be generally classed in two categories, namely: First category:

Those which exploit the kinetic energy and which are known under the general designation of momentum wheels. Second category:

Those which utilize the rotary speed to process various fluids and in which are included rotary devices such as centrifuges or ultracentrifuges, molecular pumps and turbines generally.

The technological design of these bodies differs notably according to whether the first or the second category are concerned but there remain several points which are common to both, notably as regards the rotor, the bearings or centering means and the drive means.

Thus bodies of the first category generally but not exclusively have their stator part inside and their rotor part outside so as to be able to concentrate the maximum of useful mass on the outer rim.

Those of the second category, on the other hand have, generally but not exclusively, their outer stator part and their inner rotor part arranged so as to be able to make the whole easily fluid-tight and/or to ensure mechanical protection in the case of accidental breaking of the rotor.

It is important to note that within the field of the present invention, all these rotary bodies possess in common:

Magnetic means constituting radially passive and axially active bearings or centering means;

A particular electromagnetic drive means which does not produce radial interaction with said bearings thereby minimizing losses by hysteresis and eddy currents;

Means of constructing the rotor to withstand the centrifugal force and, if necessary, damping when this becomes necessary with the appearance of phenomena connected with critical speeds, for example.

SUMMARY OF THE INVENTION

Now, and although the above specific means are to be found separately described in various patents previously filed by Applicant, it has been observed by the applicant that the specificity of said means did not enable their extension in application to the group of rotary bodies involved here.

On the other hand, the present invention provides a novel arrangement including the aforesaid means so that the part which extends between the bearings is completely free in order to permit the suitable implantation of useful active elements situated on the rotor part, whether the latter is in an inner configuration or even in an outer configuration.

The present invention seeks to optimize the space available for housing the rotor and include the central axial zone in structural participation in the constitution of the active rotary section so that the suspension and drive means do not take up the major portion of the available axial central region as in prior art.

In the solution provided by the present invention, all these same means are combined in a novel and original arrangement enabling maximum utilization of the central useful portion of the rotary body and, consequently, resolution of the whole of the problem posed by rotary bodies of both categories to which reference has previously been made.

In the novel and original arrangement according to the invention, the passive elements of the centering means and of the possible eddy current dampers are located at the maximum permissible axial limits whilst the axial active element of the magnetic centering means, with its axial velocity sensor, is situated in the immediate vicinity of one of the passive elements of the centering means and the electrodynamic rotating drive means is also situated in the immediate vicinity of one of the passive elements of the centering means. This very special arrangement has the effect that all the central space comprised between the zones containing the centering means, the possible dampers and the drive means, is utilizable to enable the implantation of the rotor with its special elements, whether this may be a rim such as in a cycloprofile in the outer rotor portion configuration, or a rotor such as with a web and subcircular winding in the internal rotor portion configuration and this, whatever the ratio length/diameter of the rotary body concerned.

Due to the increased distance between the bearings obtained by the present invention, it is possible to obtain a high length/diameter ratio for the rotor and to thereby permit a larger mass for the rotor.

BRIEF DESCRIPTION OF THE DRAWINGS

Other features, advantages, and particularities of the invention will emerge from the description which follows, with reference to the accompanying drawings of which.

Figure 3:
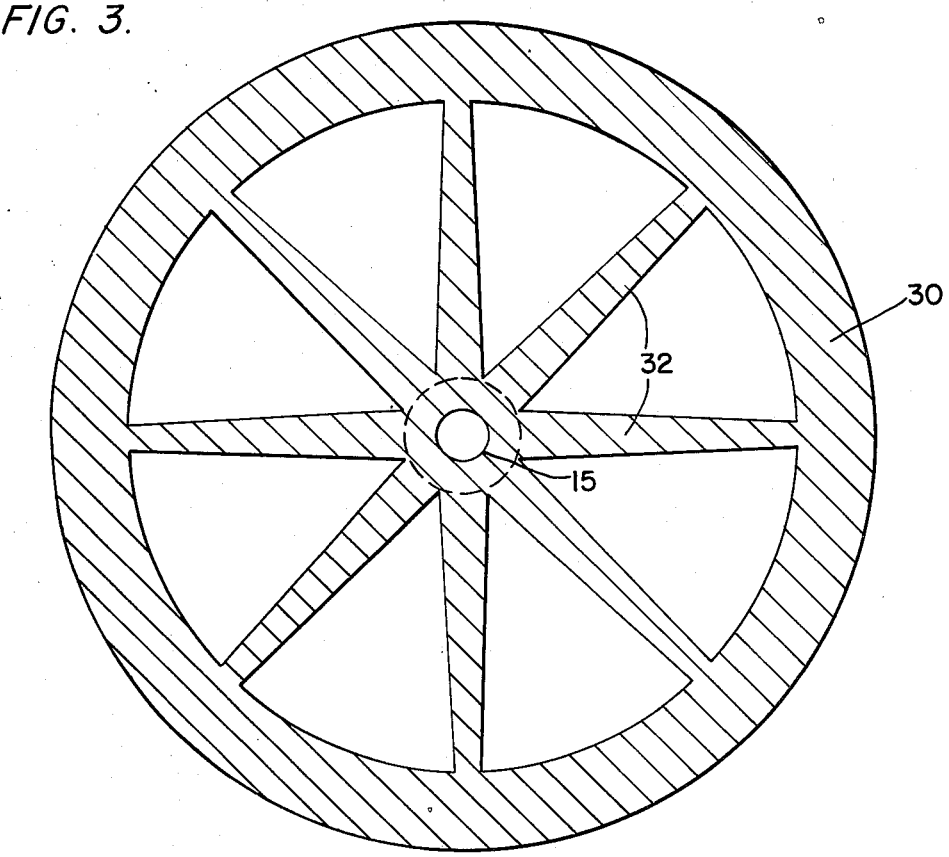
FIG. 3 is a plan cross-sectional view of the rotor portion of the embodiment of BI of FIG. 1.

It should be noted that all parts are found in each of the embodiments whether or not illustrated with that embodiment, except that the rotor of FIG. 3 is illustrative of only one of the embodiments.

DESCRIPTION OF THE PREFERRED EMBODIMENT

All magnetically suspended bodies according to the present invention may be determined, according to their function, as momentum wheels or as centrifuge type rotary devices.

Figure 1:
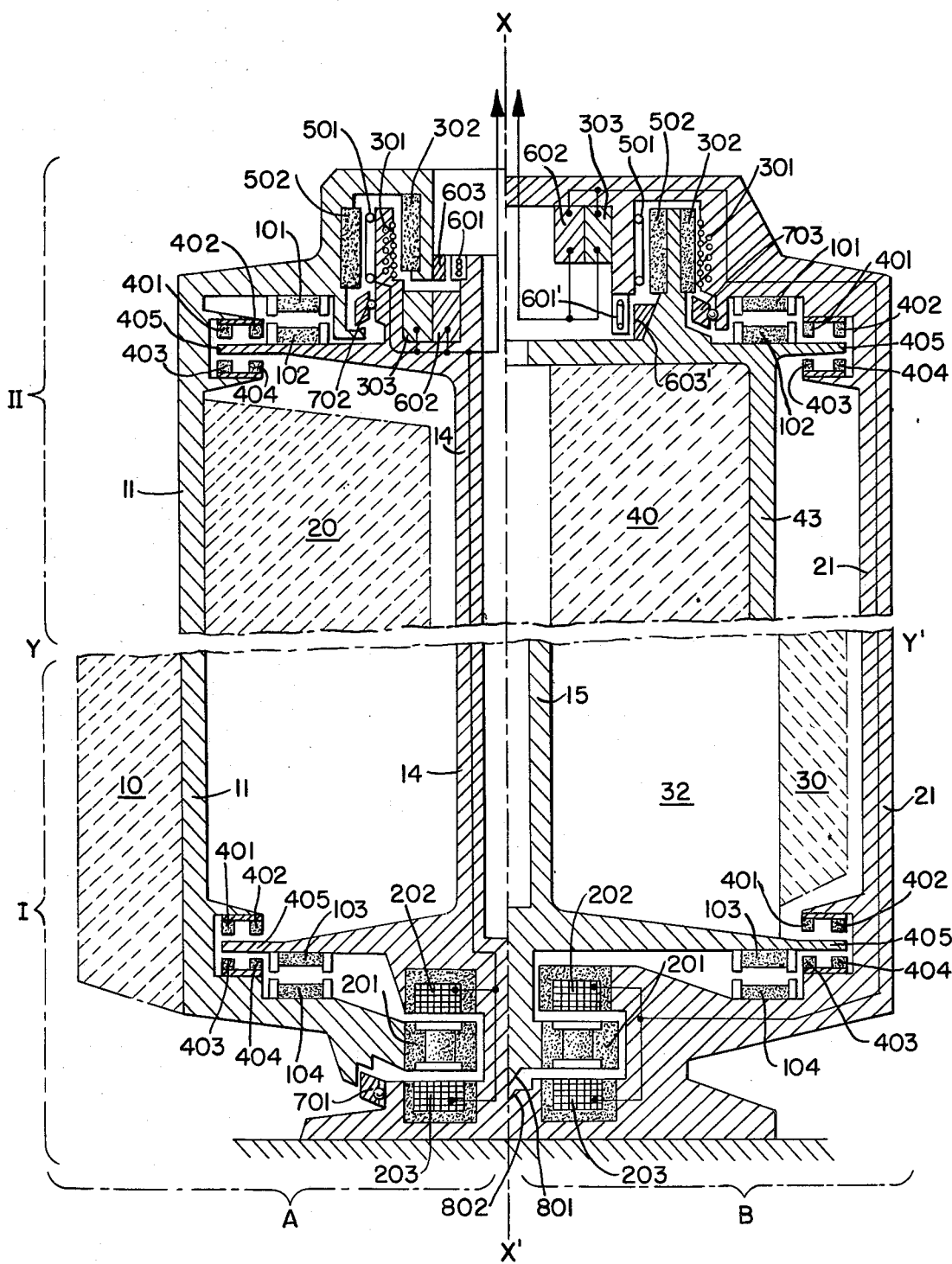
FIG. 1 illustrates in partial elevational views four embodiments AI, AII, BI, and BII making up four quadrants of a rotary body, whereby the remaining portion of each embodiment would be illustrative of a rotary body accomplishing the objects of the present invention.

To this end, the rotary body of FIG. 1 taken as a whole has been cut along two axes at right angles, one vertical XX' and the other horizontal YY', into four sections, namely: a left hand section denoted by the general reference A and a right hand section denoted by the general reference B.

In addition, each of said sections A and B is, itself, cut into a lower portion denoted by the general reference I and into an upper portion denoted by the general reference II.

The various combinations of means possible appear clearly on studying FIG. 1.

Thus:

1. A combination of the type AI leads to momentum wheels in which the outer mass is included in a space 10 on the outer periphery of the rotor outside the wall of rotor portion 11;

2. A combination of the type AII leads:
   either to momentum wheels in which the mass is included in a space 20 on the inner periphery of the rotor and supported against the outer wall of rotor portion 11;
   or centrifugal devices in which the space 20 is utilizable;

3. A combination of the type BI leads:
   either to momentum wheels in which the mass is included in the space 30 internally in relation to the stator and in fluid-tight subcircular support against the webs 32 and in which there is provided a fluid-tight safety jacket 21 which is fixed in relation to the stator and may form a portion of the stator;
   or centrifugal devices in which a wall is included in the space 30 internally in relation to the stator and in subcircular fluid tight support against the webs 32 and in which there is provided a fluid-tight safety jacket 21 which is fixed in relation to the stator and may form a portion of the stator;

4. A combination of the type BII leads:
   either to momentum wheels in which the mass is included in a space 40 and supported on a wall 43 and in which there is provided a fluid-tight safety jacket 21;
   or to centrifugal devices in which the space 40 is utilizable and in which is provided a fluid-tight safety jacket 21.

It appears that whatever the type of combination considered above, all the rotary bodies have in common the particular arrangement of placement of instrumentation towards the axial ends X or X': magnetic suspension devices; drive and possible damping means; and emergency bearings, in order to render the central portion of the rotary body completely utilizable and this, for any ratio of length/diameter envisaged.

Moreover, as will be demonstrated in detail below, all the possible combinations illustrated in FIG. 1 bring together elements described separately in prior art patents but in a novel arrangement which has not been described hitherto in the prior art and which constitutes a novel combination of known means which novel combination is the essence of the present invention.

The rotary bodies rotating around the axis XX' concerned possess: an external rotor portion 11 and an internal stator portion 14 in the two configurations A: an internal rotor portion 15 and an external stator portion formed by jacket 21 in the configurations B, it being noted that the latter can include in addition and as a modification, either a structure with an outer wall 43 (combination of the BII type), or a structure with webs 32 and subcircular winding over webs 32 (combination of the type BI).

More precisely and, as has been mentioned above, it will be demonstrated with reference to the figures, how some of the means known per se previously through various patents and patent applications of the present Applicant, are applied according to the novel and original arrangement of the invention which positions said means to the maximum axial limits permitted for the rotary body.

The four embodiments of FIG. 1 all have certain common parts some of which are shown in the different embodiments but which are all usually used for each complete working embodiment. These parts are as described in the following text of this specification.

Passive radial magnetic centering means are formed by an upper pair of magnetic cores 101, 102 and a lower pair of magnetic cores 103, 104 coaxial to the XX' axis of the rotary body with one of each pair connected to the rotor and the other of that pair connected to the stator. Such connections to rotor and stator are switched from embodiments of AII and BII and from embodiments AI and BI but the structure and operation is the same in all embodiments. Each of the pairs 101, 102 and 103, 104 of magnetic cores is composed of rectangular-section cores of high aspect ratio made of a high-magnetic energy material such as, for example, samarian-cobalt. These cores 101, 102 and 103, 104 in each pair have opposite and complementary polarities attached to rotor and stator respectively and are located in soft iron pole sleeves on their inner and outer curved surfaces. The concentrated axial fields set up in gaps between adjacent pole ring end faces of cores 101 and 102 and cores 103 and 104 give rise to appreciable radial centering forces for quite small radial displacements of the rotor with respect to the stator.

Active axial magnetic centering means located in the lower part of the rotor-stator structure are shown in embodiments AI and BI but are a part of all embodiments to oppose the tendency to de-center the rotor in an axial direction brought on by the attraction forces between the iron pole sleeves in the passive radial magnetic centering means. This centering means which is shown in FIG. 1 is composed of a permanent magnet, magnetic core ring 201 of samarium cobalt mounted on the rotor, either 11, 15 or 43, between an upper electromagnetic coil 202 and a lower electromagnetic coil 203 with the whole centering means located at an axial end of the rotor and the coils 202 and 203 mounted on the stator 14 or 21. The coils 202, 203 are connected in a circuit to receive correction signals and current flowing in one direction or the other causes axial forces in the air gaps between coils 202, 203 and magnetic core ring 201 being a function of the destabilizing errors ascertained by sensors.

Such a sensor used in the present case is an axial velocity sensor shown located in the upper portion of the rotary body, see embodiments AII, BII. The axial velocity sensor functions in a manner similar to the coil-magnet device of the centering means but as a signal generator, consisting of a single toroidal winding 301 carried on the stator, in the field of a high magnetic toroidal magnet 302 of, for example, samarium-cobalt, attached to the rotor. Signals generated in winding 301 control through electronic servocoupling means 303, the current to coils 202 and 203.

In order to prevent excessive speeds of rotor motion and the possibility of mechanical contact occurring between parts of the rotor and stator, radial damping of the rotor motion is introduced by the use of two eddy current dampers at both opposite axial ends of the rotor and stator. These current dampers consist of four permanent magnet rings 401"404 located on either the rotor, as in embodiments AI and AII or on the stator, as in embodiments BI and BII, and conducting discs 405 made, for example, of aluminum, silver, or copper on the opposite stator or rotor member respectively passing in the air gap between pairs of the magnet rings as in FIG. 1. Any radial shift of the rotor generates, in accordance with Lenz' law, eddy currents to be induced in the metal of disc 405 that interact with the permanent magnet fields to produce forces opposing the disrupting action.

Figure 2:
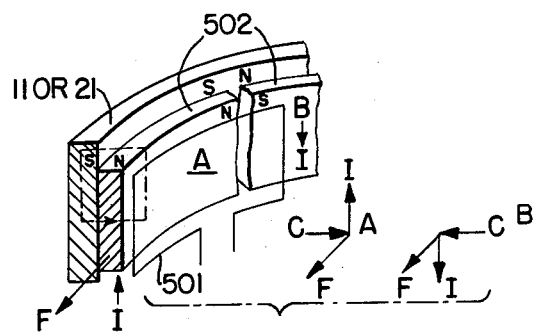
FIG. 2 is a diagrammatic view of a form of electromagnetic motor used with the present invention as shown in sections AII and BII.

A drive motor as shown enlarged and in more detail in FIG. 2 is mounted at the axial end of the rotor and stator having on the stator a circuit 501 of axial turns, and on the rotor, a plurality of magnets 502 with an alternating radial magnetic field C arranged in sectors opposite said turns of circuit 501. Thus the direction of the current I in the successive turns is reversed, as shown in vector diagrams labelled A and B of FIG. 2, in order to produce a cumulative effect in the electromotive forces F which rotate the armature about its axis, or conversely, a rotation of the field magnet generates currents in the turns in accordance with the laws of induction.

Various electronics switching known means can be used for the motor of the type shown in FIG. 2. As an example, a small transmitter coil 601 or 601' shown fixed to the stator and energized with a 50 kilohertz current through the electronics switch 602 can be coupled to two receiver coils positioned on each side of the transmitter coil, the coupling being produced by a strip 603 or 603' of ferromagnetic material fixed to the rotor and provided with windings in relation to the number and position of the magnets and breaking the coupling. A signal in one of the receiver coils will indicate the presence of a magnet of specific polarity facing a corresponding winding and will trigger the passage of the current in the appropriate direction through the winding, while a signal in the other receiver coil triggers the flow of current in the opposite direction in the same winding or triggers the flow of current in another winding.

If the magnetic suspension is lost the support of the rotor is taken over by emergency bearings 701, 702, or 703. These bearings produce no mechanical contact between the rotor and the stator under normal operating conditions. Bearings 701 and 702 have the form of bearings used in the case of the internal stator of the configurations AI and AII, and bearing 703 is used in the case of the external stator of the configurations BI and BII.

Pivot 801 and step bearing 802, only half of which is shown, are an example of use with the external stator of configuration BI and if there is a failure of the active axial magnetic centering means, operation may still continue for a comparatively long period of time.

The structure of the present invention is utilized in all cases where a momentum wheel or a rotary device rotates on a magnetic centering means of the radially passive and axially active types with servocoupling to a speed sensor and it is the purpose to leave the maximum space possible available in the central portion.

With all the configurations of FIG. 1 in general the invention may be used in order to keep the central portion free but in the embodiment of the configuration of BI the use of the present invention is obligatory. In the embodiment of BI a rotor having the framework shown in FIG. 3 is used. In the plan view of FIG. 3 the space 30 holds the mass of the rotor weight connected to internal rotor portion 15 by webs 32, said webs 32 being radial in the central portion, thus totally occupying the central portion. Therefore, the arrangement of the means described is such that these means including the magnetic and electromagnetic suspension and drive means of the rotary portion are pushed back to the maximum permissible axial limits so that the rotary portion can extend into the entire central zone.

It will be well understood that the present invention has only been described and illustrated by way of preferred examples and that equivalent elements could be substituted for its constituent elements according to the fields of operation, without however departing from the scope of said invention, which is as defined in the appended claims.

I claim:

1. A magnetically suspended rotary body having momentum wheel configuration comprising
   a stator;
   a rotor having a rotation shaft mounted for support relative to said stator;
   emergency support systems located at the axial ends of said rotation shaft;
   a velocity sensor having a magnetic core and an adjacent winding for sensing the axial velocity of said rotor in relation to said stator, said core and said winding adjacently mounted with one of them mounted on said rotor and the other mounted on said stator;
   passive radial magnetic centering means formed by coaxial magnet cores with alternating axial magnetic fields mounted on the axial ends of said rotor and coaxial magnetic cores rigidly connected to said stator adjacent said cores on said rotor;
   an active axial magnetic centering means having a magnetic core mounted on said rotor disposed opposite a coil fast to said stator receiving correction signals from said axial velocity sensor, said last-mentioned magnetic core and coil positioned at an axial end of said rotor in the immediate vicinity of said passive radial magnetic centering means;
   a drive motor mounted on the axial ends of said rotor and said stator;
   a motor switching detector connected to said motor and positioned near said motor at the axial ends of said rotation shaft;
   and said rotor having an inertial element formed with a peripheral mass in an axial central zone between axial ends of said rotor and external to a periphery of said rotor.

2. A magnetically suspended rotary body according to claim 1, further characterized by two eddy current dampers positioned at the axial ends and connecting said rotor and said stator through a magnetic field by mounting on one and passing the magnetic field through the other of said stator and said rotor.

3. A magnetically suspended rotary body having momentum wheel configuration comprising
   a stator;
   a rotor having a rotation shaft mounted for support relative to said stator;
   emergency support systems located at the axial ends of said rotation shaft;
   a velocity sensor having a magnetic core and an adjacent winding for sensing the axial velocity of said rotor in relation to said stator, said core and said winding adjacently mounted with one of them mounted on said rotor and the other mounted on said stator;

passive radial magnetic centering means formed by coaxial magnet cores with alternating axial magnetic fields mounted on the axial ends of said rotor and coaxial magnetic cores rigidly connected to said stator adjacent said cores on said rotor;

an active axial magnetic centering means having a magnetic core mounted on said rotor disposed opposite a coil fast to said stator receiving correction signals from said axial velocity sensor, said last-mentioned magnetic core and coil positioned at an axial end of said rotor in the immediate vicinity of said passive radial magnetic center means;

a drive motor mounted on the axial ends of said rotor and said stator;

a motor switching detector connected to said motor and positioned near said motor at the axial ends of said rotation shaft;

and said rotor having an inertial element formed with a peripheral mass in an axial central zone between axial ends of said rotor and internal to a periphery of said rotor.

4. A magnetically suspended rotary body according to claim 3, further characterized by two eddy current dampers positioned at the axial ends and connecting said rotor and said stator through a magnetic field by mounting on one and passing the magnetic field through the other of said stator and said rotor.

5. A magnetically suspended rotary body having momentum wheel configuration comprising a stator;

a rotor having a rotation shaft mounted for support relative to said stator;

emergency support systems located at the axial ends of said rotation shaft;

a velocity sensor having a magnetic core and an adjacent winding for sensing the axial velocity of said rotor in relation to said stator, said core and said winding adjacently mounted with one of them mounted on said rotor and the other mounted on said stator;

passive radial magnetic centering means formed by coaxial magnetic cores with alternating axial magnetic fields mounted on the axial ends of said rotor and coaxial magnetic cores rigidly connected to said stator adjacent said cores on said rotor;

an active axial magnetic centering means having a magnetic core mounted on said rotor disposed opposite a coil fast to said stator receiving correction signals from said axial velocity sensor, said last-mentioned magnetic core and coil positioned at an axial end of said rotor in the immediate vicinity of said passive radial magnetic centering means;

a drive motor mounted on the axial ends of said rotor and said stator;

a motor switching detector connected to said motor and positioned near said motor at the axial ends of said rotation shaft;

said rotor having an inertial element formed with a peripheral mass in an axial central zone between axial ends of said rotor;

said rotor having radial webs upon which said peripheral mass is supported in internally in relation to said stator.

6. A magnetically suspended rotary body according to claim 5, further characterized by two eddy current dampers positioned at the axial ends and connecting said rotor and said stator through a magnetic field by mounting on one and passing the magnetic field through the other of said stator and said rotor.

7. A magnetically suspended rotary body having a configuration comprising a stator;

a rotor having a rotation shaft mounted for support relative to said stator;

emergency support systems located at the axial ends of said rotation shaft;

a velocity sensor having a magnetic core and an adjacent winding for sensing the axial velocity of said rotor in relation to said stator, said core and said winding adjacently mounted with one of them mounted on said rotor and the other mounted on said stator;

passive radial magnetic centering means formed by coaxial magnet cores with alternating axial magnetic fields mounted on the axial ends of said rotor and coaxial magnetic cores rigidly connected to said stator adjacent said cores on said rotor;

an active axial magnetic centering means having a magnetic core mounted on said rotor disposed opposite a coil fast to said stator receiving correction signals from said axial velocity sensor, said last-mentioned magnetic core and coil positioned at an axial end of said rotor in the immediate vicinity of said passive radial magnetic centering means;

a drive motor mounted on the axial ends of said rotor and said stator;

a motor switching detector connected to said motor and positioned near said motor at the axial ends of said rotation shaft;

a fluid-tight fixed part of the rotary body fixed in relation to said stator;

and said rotary enclosure in an axial central zone between axial ends of said rotor and within a fluid-tight fixed part of the rotary body.

8. A magnetically suspended rotary body according to claim 7, further characterized by two eddy current dampers positioned at the axial ends and connecting said rotor and said stator through a magnetic field by mounting on one and passing the magnetic field through the other of said stator and said rotor.

9. A magnetically suspended rotary body having a configuration comprising a stator;

a rotor having a rotation shaft mounted for support relative to said stator;

emergency support systems located at the axial ends of said rotation shaft;

a velocity sensor having a magnetic core and an adjacent winding for sensing the axial velocity of said rotor in relation to said stator, said core and said winding adjacently mounted with one of them mounted on said rotor and the other mounted on said stator;

passive radial magnetic centering means formed by coaxial magnet cores with alternating axial magnetic fields mounted on the axial ends of said rotor and coaxial magnetic cores rigidly connected to said stator adjacent said cores on said rotor;

an active axial magnetic centering means having a magnetic core mounted on said rotor disposed opposite a coil fast to said stator receiving correction signals from said axial velocity sensor, said last-mentioned magnetic core and coil positioned at an axial end of said rotor in the immediate vicinity of said passive radial magnetic centering means;

a drive motor mounted on the axial ends of said rotor and said stator;

a motor switching detector connected to said motor and positioned near said motor at the axial ends of said rotation shaft;

a fixed part of the rotary body fixed in relation to said stator;

and a rotary enclosure in an axial central zone between axial ends of said rotor and external to said fixed part of the rotary body.

10. A magnetically suspended rotary body according to claim 9, further characterized by eddy current dampers positioned at the axial ends and connecting said rotor and said stator through a magnetic field by mounting on one and passing the magnetic field through the other of said stator and said rotor.

* * * * *